United States Patent
Hopf

[19]

[11] Patent Number: 6,025,655
[45] Date of Patent: Feb. 15, 2000

[54] CONTROL SYSTEM, PARTICULARLY FOR A MOTOR VEHICLE

[75] Inventor: Thomas Hopf, Bensheim, Germany

[73] Assignee: Mannesmann VDO AG, Frankfurt, Germany

[21] Appl. No.: 08/944,845

[22] Filed: Oct. 6, 1997

[51] Int. Cl.[7] .............................. B60R 25/00; H01H 3/34
[52] U.S. Cl. ...................... 307/10.2; 307/141.4; 180/287
[58] Field of Search ................... 307/9.1–10.8, 307/141, 141.4; 701/29, 30, 31, 33, 35, 114, 115, 102; 180/287

[56] References Cited

U.S. PATENT DOCUMENTS

| | | | |
|---|---|---|---|
| 4,403,175 | 9/1983 | Ruumpol ................................. | 318/53 |
| 4,461,003 | 7/1984 | Tamaki .................................... | 371/66 |
| 4,495,579 | 1/1985 | Fukushima et al. .................... | 701/114 |
| 4,791,569 | 12/1988 | Suzuki .................................... | 701/114 |
| 4,964,049 | 10/1990 | Abe et al. ............................... | 701/114 |
| 5,012,414 | 4/1991 | Ishii et al. .............................. | 340/438 |
| 5,099,429 | 3/1992 | Onari et al. ............................ | 701/114 |
| 5,189,617 | 2/1993 | Shiraishi ................................ | 701/114 |
| 5,444,626 | 8/1995 | Schenk ................................... | 701/114 |
| 5,473,201 | 12/1995 | Gantenbein et al. .................. | 307/10.6 |
| 5,519,260 | 5/1996 | Washington .......................... | 307/10.5 |
| 5,521,588 | 5/1996 | Kuhner et al. ..................... | 340/825.22 |
| 5,528,086 | 6/1996 | Maass et al. .......................... | 307/10.5 |
| 5,583,383 | 12/1996 | Denz et al. ............................ | 307/10.2 |
| 5,588,123 | 12/1996 | Loibl ..................................... | 701/114 |
| 5,640,056 | 6/1997 | Setzer et al. .......................... | 307/10.1 |

Primary Examiner—Richard T. Elms
Attorney, Agent, or Firm—Martin A. Farber

[57] ABSTRACT

A control system, particularly for a motor vehicle, having at least one control device which, in order to produce control parameters, is connected with a timer circuit for the production of a time parameter. In order to provide a control system in which a timer signal is available at all times, without the voltage supply system of the motor vehicle being under load when the engine is turned off, the timer circuit is located outside the control device.

12 Claims, 2 Drawing Sheets

CONTROL SYSTEM, PARTICULARLY FOR A MOTOR VEHICLE

FIELD AND BACKGROUND OF THE INVENTION

The present invention relates to a control system, particularly for a motor vehicle, having at least one control device which, for the production of control parameters, is connected with a timer circuit for producing a time parameter.

A data processing system for a motor vehicle is known in which several control devices exchange data over a data-transfer line, there being at least one control unit detecting operating parameters and processing them to form control parameters.

For the detecting of certain control parameters it is necessary to determine how much time has passed since the engine was turned off. For this purpose, a counter which calculates this time is contained in the control unit itself.

In order to assure the operation of the counter, the control device must continue to be provided by the battery with current after the engine has been turned off. Over the course of several hours, this leads to supply problems since the battery of the vehicle is discharged.

SUMMARY OF THE INVENTION

The object of the invention is therefore to provide a control system in which a time signal is available at all times without the voltage supply system of the vehicle being drawn on when the engine has been turned off.

In accordance with the invention this object is achieved in the manner that a timer switch is arranged outside of the control device.

The timer switch is preferably located in a second control device.

The advantage of the invention resides in the fact that a timer circuit which is already present is used in order to determine control parameters with the aid of the control device.

A separate timer circuit is not present in this control device. Thus, furthermore, no supply of current is necessary when not traveling.

In one embodiment, the first and the second control devices are connected to each other via a data transfer line. The data transfer line can advantageously be a CAN bus.

Alternatively, the first and the second control devices are connected via an interface circuit with each other for a reading of the time parameter.

Thus no additional expense is necessary either for the data transfer, since such transfer devices are present in modern motor vehicles.

The time can be determined in a particularly simple fashion if the time parameter can be fed via the data transfer line to a memory unit of the first control device, and the stored time parameter is to be read out of the memory for later evaluation. In this connection, at least one control device is connected with a device which supplies an additional signal for a storing of the time parameter.

When the invention is employed in a motor vehicle, the first control device is a central engine control electronics, and the second control device is the control electronics of an instrument cluster of a motor vehicle.

In one method for determining a control parameter for a motor vehicle with the aid of a time parameter by means of a system of the invention for the production of control parameters by a timer circuit located outside the control device, the time at which the time parameter is transmitted or stored is determined with the aid of an additional signal. This additional signal may advantageously be an operating parameter present on the control device.

In one embodiment, the operating parameter is the ignition, the time parameter being transferred from the second control device to the first control device upon the connecting and disconnecting of the ignition and stored there.

In another embodiment, the operating parameter is the speed of rotation of the engine, the time parameter being transferred and stored when a given speed of rotation of the engine is reached.

An engine shut-down time is determined from the difference between the actual time parameter transferred and the time parameter stored.

Thus, a time determination can be carried out easily and comfortably with signals which are already present in the motor vehicle.

BRIEF DESCRIPTION OF THE DRAWINGS

With the above and other objects and other advantages in view, the present invention will become more clearly understood in connection with the detailed description of preferred embodiments, when considered with the accompanying drawings of which.

DETAILED DESCRIPTION OF THE PREFERRED EMBODIMENTS

Figure 1:
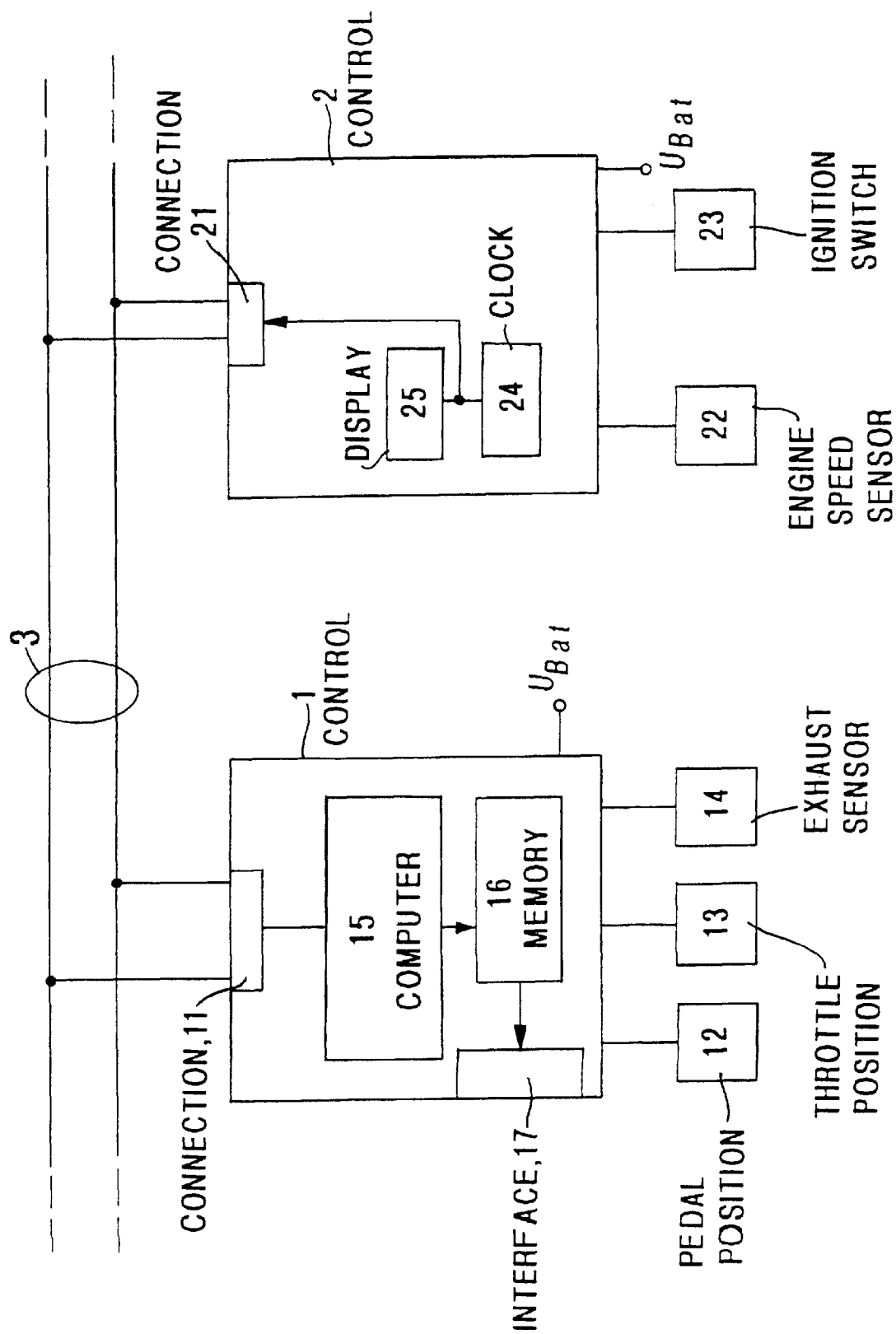
FIG. 1 is a first embodiment of the invention.

In the embodiment shown in FIG. 1, an engine control unit 1 and a control unit 2 for an instrument cluster are connected via a bus 3 (for instance a CAN bus) in a motor vehicle. The engine control unit 1 assumes open loop and closed loop control functions for the engine of the motor vehicle, while the control unit 2 detects and displays certain operating parameters of the motor vehicle intended for the instrument cluster such as speed, engine speed of revolution, coolant temperature, as well as functions such as actuation of the blinker switch.

The control devices described are known in their construction and function so that for the explanation of the invention, only the essential components will be discussed below, in which connection further components which are necessary for the instrument cluster may be present.

The engine control unit 1 has a bus connection 11 by which the latter is connected to the bus 3. In order to detect a power requirement, a pedal position indicator 12, and in order to detect a power setting, a throttle-valve position indicator 13 are provided. Furthermore, the engine control unit 1 is connected with a sensor 14 which is arranged in the exhaust channel of the motor vehicle.

The control unit 2 for the instrument cluster also has a bus connection 21. Furthermore, it is connected with a sensor 22 for the engine speed of revolution and with the ignition switch 23.

In the control unit 2 there is provided a known, autonomously operating clock circuit 24 which contains all circuits necessary for a quartz clock. One output of the clock circuit 24 is connected with a liquid crystal display 25 by means of which the time is displayed to the driver. The display 25 can, however, also be used for the indicating of other parameters.

A second output of the clock circuit 24 leads to the bus connection 21 of the control device 2.

Microprocessors are customarily used in control devices in motor vehicles for display and monitoring as well as in open-loop and closed-loop control processes.

The clock circuit 24 contained in the control device 2 can thus also be a microprocessor which also assumes other tasks in connection with monitoring and display in the motor vehicle.

The clock circuit 24 can, however, also be one of the known integrated circuits for clocks, particularly for quartz clocks.

The engine control unit 1 also has a microcomputer 15 which communicates with the clock circuit of the control unit 2 via the bus 3.

It is known for the feeding of the fuel to take place as a function of the composition of the exhaust gas. The after-treatment of the exhaust gas takes place here in a catalytic converter. The signal concerning the composition of the exhaust gas is fed in this connection to the engine control device by the exhaust-gas probe (sensor) 14 which controls the injection of the fuel as a function thereof. In order, upon starting, to be able to take as basis operating conditoins which are as accurate as possible, information with regard to the efficiency of the catalytic converter is necessary.

In the present case, the time which has passed since the ignition of the vehicle was turned off is to be determined. By means of this time, the temperature of the catalytic converter of the engine upon the next start is then calculated. A table which is contained in the microcomputer 15 of the engine control unit 1 shows the relationship of the temperature of the catalytic converter and the engine shut-off time up to 24 hours.

With the signal "ignition off" of the ignition switch 23 on the control device 2 the actual time is transmitted to the engine control device 1 via the bus 3 and stored in the memory 16 of the engine control electronics 1. If the signal "ignition on" is detected by the instrument cluster control device 2 on the ignition switch 23, then the actual time is transmitted to the engine control device 1. The microcomputer 15 of the engine control device 1 determines a time difference, the engine shut-off time, from the actual time and the stored time upon the shutting-off of the engine. With the aid of this engine shut-off time, the corresponding temperature of the catalytic converter is read from the table. This catalytic converter temperature is fed via the interface 17 to an injection control (not shown) and processed further there.

However, the time signal can also be transferred in the event of the presence of a given speed of revolution of the engine which is so selected that a reliable conclusion as to the turning-off or on of the engine can be reached.

In another embodiment, as from the application of the operating voltage $U_{Bat}$, the time signal is transferred continuously to the engine controlling electronics and placed in the memory 16 of the engine control electronics 1 only in case of the corresponding speed of revolution of the engine or in the of the signal ignition switch "on or off". For this purpose, however, it is necessary that the speed of revolution signal (sensor 22) or the information as to a change in the position of the ignition switch (sensor 23) be also transmitted by the instrument-cluster control device 2.

Figure 2:
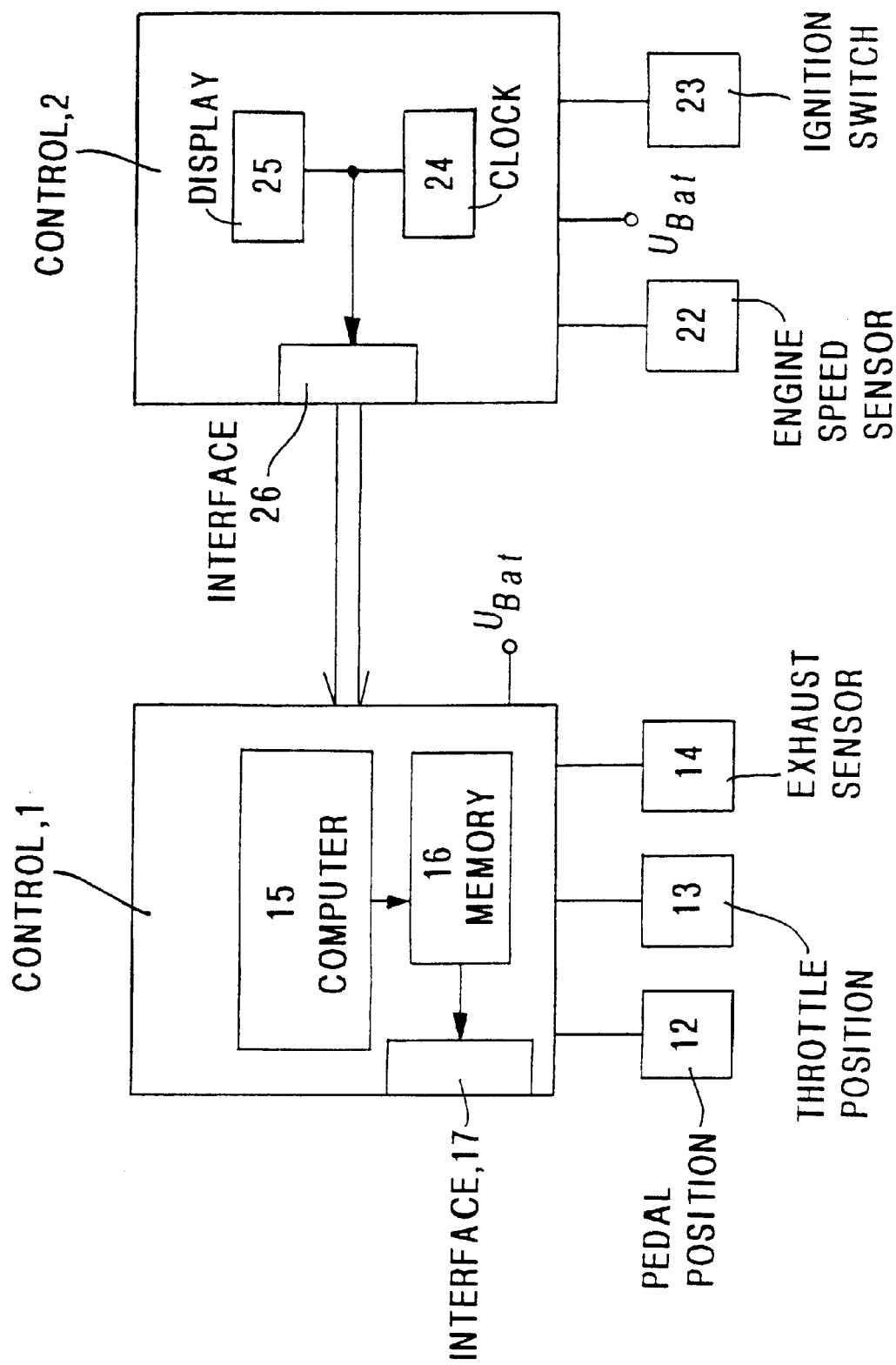
FIG. 2 is a second embodiment of the invention.

The engine control device shown in FIG. 2 and the instrument cluster control device 2 have the same construction as in FIG. 1. The instrument cluster control device 2 has, in addition, an interface 26 via which the above-discussed signals are transmitted to the engine control device 1.

By means of the arrangement shown, it is possible to process a time signal in the engine control device without additional expense.

I claim:

1. A control system, suitable for a motor vehicle, the system comprising a timer circuit, and at least one control unit which, for the production of control parameters, is connected with the timer circuit for the production of a time parameter, wherein the timer circuit is located outside of the control unit for the purpose of determining an engine shutdown time;

the control unit is a first control unit, the system further comprising a second control unit, and the timer circuit is located in the second control unit;

wherein the second control unit is the control electronics of an instrument cluster of a motor vehicle.

2. A control system according to claim 1, further comprising a data transfer bus, wherein the first control unit and the second control unit are connected to each other by the data-transfer line.

3. A control system according to claim 2, wherein the data-transfer line is a CAN bus.

4. A control system according to claim 1, further comprising a memory within the first control unit, and a data transfer bus, wherein the time parameter is feedable to the memory of the first control unit via the data transfer bus, and the time parameter is readable out of the memory for subsequent evaluation.

5. A control system according to claim 4, wherein at least one of said control units is connected with a device which supplies an additional signal for the storing of the time parameter.

6. A control system according to claim 1, wherein the control unit comprises a central engine control electronics.

7. A control system according to claim 1, further comprising an interface circuit, wherein the first control unit and the second control unit are connected to each other by the interface circuit for the reading of the time parameter.

8. A method for determining a control parameter for a motor vehicle with the aid of a time parameter by means of a control system suitable for a motor vehicle, the system comprising a timer circuit, and at least one control unit which, for the production of control parameters, is connected with the timer circuit for the production of a time parameter, wherein the control unit is a first control unit, the system further comprising a second control unit;

the method comprising steps of:

locating the timer circuit outside of the control unit for the purpose of determining an engine shutdown time;

determining, with the aid of an additional signal, a time at which the time parameter is transferred or stored; and employing a control electronics of an instrument cluster of a motor vehicle as the second control unit.

9. A method according to claim 8, the determining step being based on a difference between an actual time parameter transmitted and a time parameter stored.

10. A method according to claim 8, wherein the additional signal is an operating parameter present on the control unit.

11. A method according to claim 10, wherein the operating parameter is the ignition, and the method comprises a step of processing the time parameter from the second control unit to the first control unit upon a turning on and off of the ignition of the motor vehicle, the processing being respectively, a transferring or a storing of the time parameter.

12. A method according to claim 10, wherein the operating parameter is the engine speed of revolution, and the method comprises a step of processing the time parameter upon the occurrence of a given speed of revolution of the engines, the processing being, respectively, a transferring or a storing of the time parameter.

* * * * *